United States Patent
Padur et al.

(10) Patent No.: US 9,654,973 B2
(45) Date of Patent: May 16, 2017

(54) SYSTEM AND METHOD FOR WIRELESS MANAGEMENT ACCESS TO A TELECOMMUNICATIONS DEVICE

(71) Applicant: Adtran, Inc., Huntsville, AL (US)

(72) Inventors: Nagaraj Padur, Madison, AL (US);
Marc Kimpe, Huntsville, AL (US);
Adam Holden, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 54 days.

(21) Appl. No.: 14/627,049

(22) Filed: Feb. 20, 2015

(65) Prior Publication Data
US 2016/0249212 A1    Aug. 25, 2016

(51) Int. Cl.
*H04B 5/00*    (2006.01)
*H04W 12/06*   (2009.01)
*H04L 29/06*   (2006.01)
*H04W 4/00*    (2009.01)

(52) U.S. Cl.
CPC ......... *H04W 12/06* (2013.01); *H04L 63/0876* (2013.01); *H04L 63/107* (2013.01); *H04W 4/008* (2013.01)

(58) Field of Classification Search
CPC ..... H04W 4/001; H04W 4/005; H04W 4/008; H04W 4/02; H04W 8/005; H04W 12/06; H04W 12/08
USPC .............................. 455/410, 411, 41.1, 41.2
See application file for complete search history.

(56) References Cited

U.S. PATENT DOCUMENTS

| | | | |
|---|---|---|---|
| 9,142,122 B2* | 9/2015 | Oshima ................. | G08C 17/02 |
| 2009/0075592 A1* | 3/2009 | Nystrom ............ | G06K 19/0719 455/41.1 |
| 2012/0324119 A1* | 12/2012 | Imes ................... | F24F 11/0086 709/227 |
| 2013/0095757 A1* | 4/2013 | Abdelsamie .......... | H04W 4/001 455/41.1 |
| 2013/0344804 A1* | 12/2013 | Chen ....................... | H04B 5/02 455/41.1 |
| 2015/0189461 A1* | 7/2015 | Pang .................... | H04W 4/008 455/41.1 |

(Continued)

FOREIGN PATENT DOCUMENTS

WO     2011048207 A1    4/2011

*Primary Examiner* — Temica M Beamer
(74) *Attorney, Agent, or Firm* — Smith Tempel Blaha LLC; Michael J. Tempel

(57) ABSTRACT

Systems and methods for wireless management access to a telecommunication device are provided. A portable device, such as a tablet, smartphone, etc., can be used to access a network device, such as a telecommunication device, by accessing a wireless access module of the telecommunication device using any desired wireless technology. When the portable device is in proximity to the telecommunication device the presence of the portable device may be detected, causing an attempted wireless communication between the portable device and the wireless access module. The portable device may provide various security information to the wireless access module that may be verified before access to the telecommunication device is granted. If the portable device is verified it may be authorized for wireless communications with the telecommunication device, including receiving an identifier for the telecommunication device.

20 Claims, 7 Drawing Sheets

(56) References Cited

U.S. PATENT DOCUMENTS

2015/0310736 A1\* 10/2015 Yamada ................ G08C 17/02
398/107

\* cited by examiner

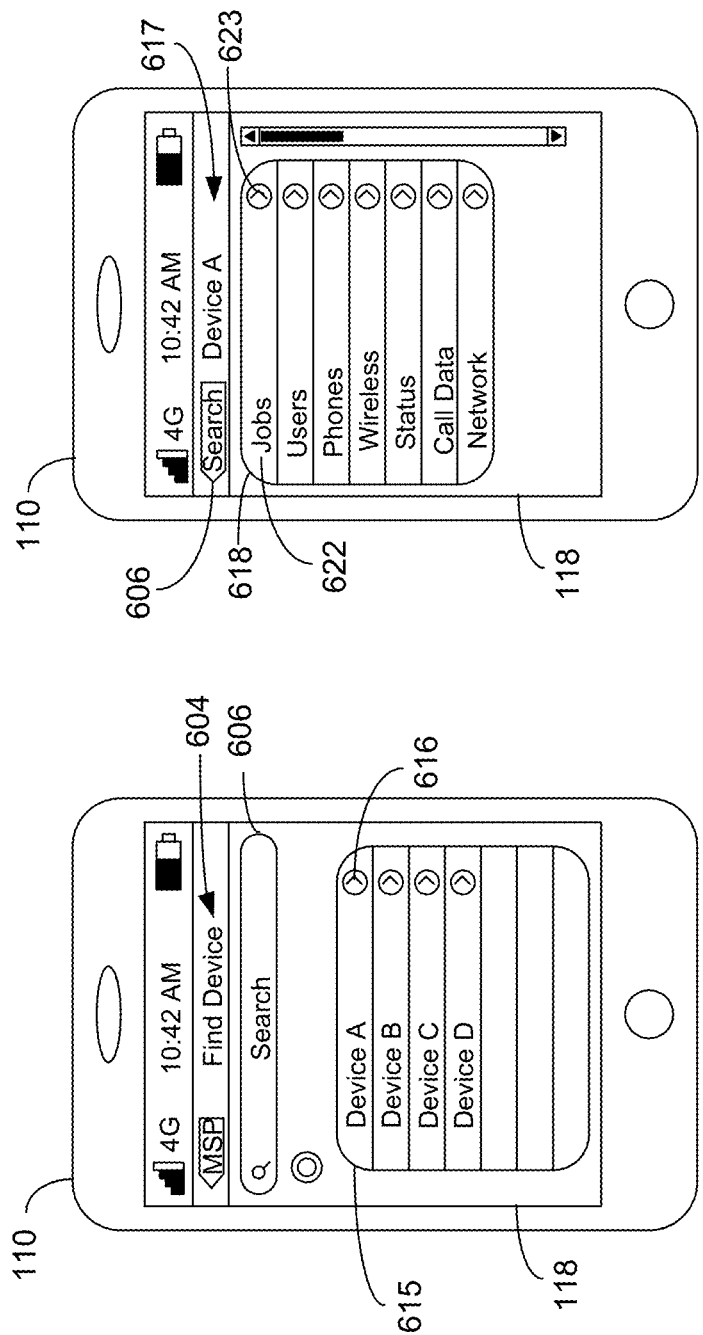

SYSTEM AND METHOD FOR WIRELESS MANAGEMENT ACCESS TO A TELECOMMUNICATIONS DEVICE

BACKGROUND

Many different types, models and versions of complex devices are implemented within a telecommunications network, including those transmitting signals over optic fibers. Such devices implemented in a telecommunications network (hereafter "Device" or "Devices") can be installed in various locations, such as at a customer location, buried underground, or mounted up on a pole or tower. These Devices may require interactions to establish telecommunication services when the devices are first installed, as well as later for periodic required testing, troubleshooting, maintenance, upgrading, and/or other interactions. Sometimes, more than one type, model or version of the Device is located at a particular location. Moreover, each Device may have unique configuration and operating parameters. When performing installation, testing, troubleshooting, maintaining, upgrading or other procedures, a technical support individual needs access to the Device, as well as gather information about each particular Device.

In many instances, obtaining access to a particular Device may be time consuming or impossible, especially when the Device in question is located in a difficult to access location. Such access requires plugging in a cable, such as an Ethernet or RS-232 cable into a port located somewhere on the Device. However, this assumes that the Device has a port, that the technician has the appropriate equipment to connect to such port, and that the port is readily accessible to the technician. Frequently, such attempts to access a Device can take valuable time and resources, and may prove impossible in the case of difficult to access Devices.

Therefore, it would be desirable to have a convenient way for a technician to access and/or communicate with a telecommunication device that overcomes the above-mentioned challenges.

SUMMARY

Embodiments of a portable technical support device include a wireless access module electrically coupled with a network device, the wireless access module configured to detect that a portable device is in proximity to the network device, the wireless access module comprising: a wireless communication element for receiving a security information from the portable device, and an access management logic for authorizing the portable device to communicate wirelessly with the network device through the wireless communication element, wherein a wireless communication from the network device to the portable device through the wireless communication element comprises an identifier of the network device.

Other embodiments are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference, numerals designate corresponding parts throughout the different views.

FIGS. 6A through 6D are a series of diagrams showing an example of the operation of components of an embodiment of the system and method for providing wireless management access to a telecommunication device.

DETAILED DESCRIPTION

Figure 1:
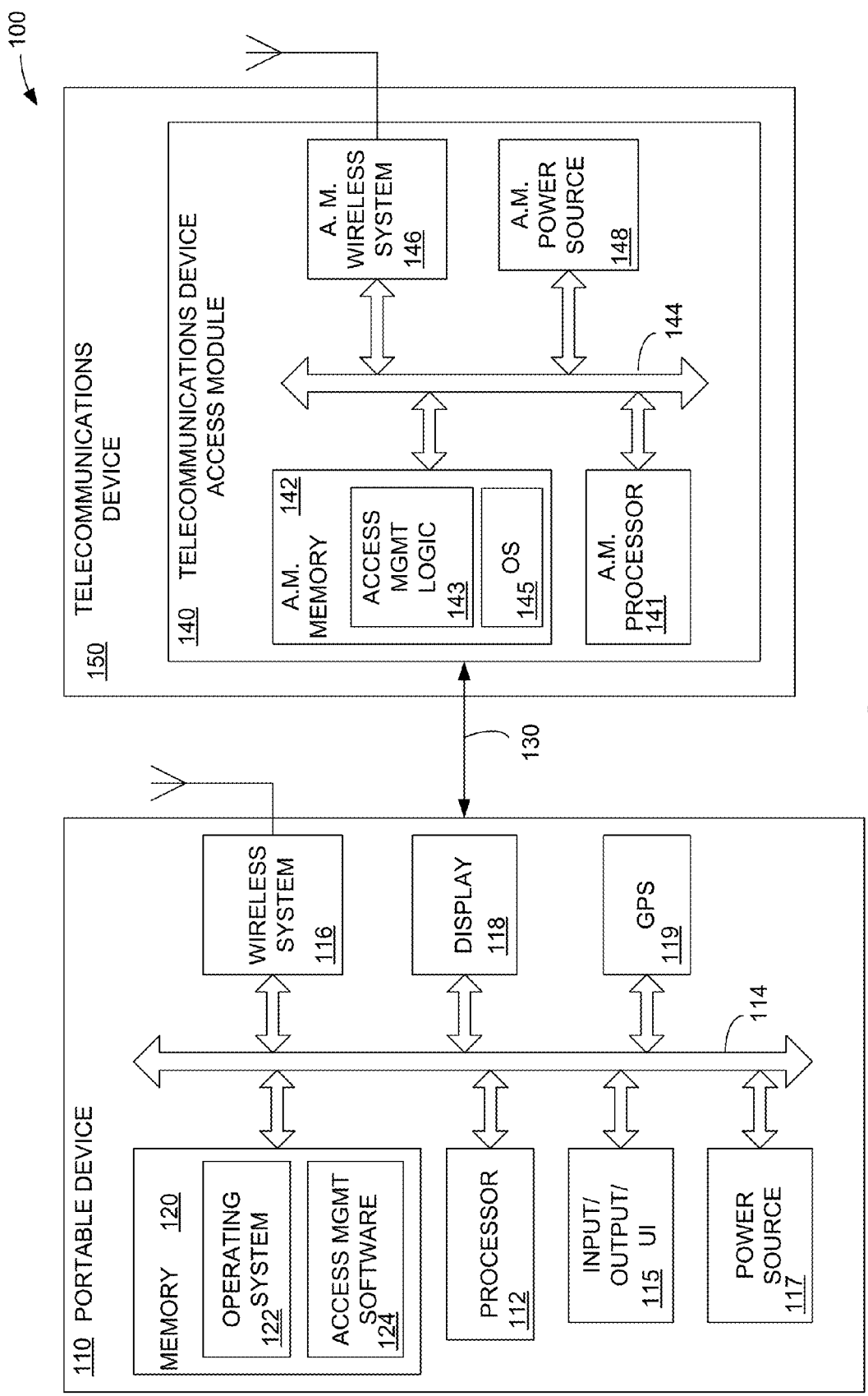
FIG. 1 is a block diagram illustrating an exemplary embodiment of system for providing wireless management access to a telecommunication device.

Although described with particular reference to a telecommunication device (hereafter "Device") implemented in a fiber optic telecommunications network, the system and method for providing wireless management access to a Device can be implemented with a variety of other types of telecommunication networks, and/or with a variety of other devices where on-site access to the Device (such as by a technician) is desired. Examples of Devices include, but are not limited to, routers, network switches, fiber-optic communication devices, and any other communication devices. Examples of a portable device which may be used to wirelessly access the Device include, but are not limited to, a smart phone, a personal digital assistant (PDA), a tablet, a portable computer, and any type of portable device through or by which wireless communications may be made. Such portable device may be a special purpose device designed to provide wireless management access to a Device, or may be a generalized portable device running software or an application that provides the functionality of wireless management access to a Device.

Thus, the system and method for providing wireless management access to a telecommunications Device may be implemented in a combination of hardware and software. The hardware component can be implemented using specialized or generally known hardware elements. The software component can be implemented using processor-executable code running on a computing device. The software can be stored in a memory and executed by a suitable instruction execution system (microprocessor). The hardware implementation of the system and method for providing wireless management access to a Device can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), a separate, specially designed integrated circuit, etc.

A portable device, such as a tablet, smartphone, etc., can be used to access a telecommunication Device, such as by accessing a wireless access module of the Device using any desired wireless technology, wireless fidelity (Wi-Fi), near field communications (NFC) and/or Bluetooth as described more fully below. When a portable device is in proximity to the Device the presence of the portable device may be detected, such as by NFC, causing an attempted wireless communication between the portable device and the wireless access module. The attempted wireless communication may also by via NFC, but may also be by a different wireless protocol or technology, such as Wi-Fi. The portable device may provide various security information to the wireless access module that may be verified before access to the Device is granted.

If the portable device is verified/authorized, it may establish wireless communications with the Device through a wireless communication element of the access module. Such communications may include receiving an identifier for the Device at the portable device and/or providing instructions from the portable device to manage the operations of the Device. Successful communication with the portable device may trigger service activation by the Device at its installation time with a second computer system in the carrier network's central office such as an Optical Line Terminal (OLT). The second computer system may also provide instructions to the Device, including instructions to add or provision the Device to the network to allow the Device to begin carrying network traffic.

In this manner, the systems and methods of the present disclosure allow for simplified, faster, and more cost-effective management of Devices of a telecommunications network located out in the field. Management is especially simplified for Devices that are located in hard to access areas, such as up on poles, in towers, buried underground, etc.

FIG. 1 is a block diagram illustrating an exemplary embodiment of system 100 for providing wireless management access to a telecommunication device. The exemplary system 100 of FIG. 1 comprises a portable device 110 in communication with an access module 140 of a telecommunication device, Device 150. In the embodiment illustrated in FIG. 1, the access module 140 is a part of or contained within the Device 150. In other embodiments, the access module 140 may be a separate component that is located remotely from, but in communication with, the Device 150. For example, in an alternative embodiment (not illustrated) where the Device 150 is mounted at or near the top of a pole, the access module 140 may be located at the bottom of the pole. In such an embodiment the access module 140 at the bottom of the pole may be in communication, such as via a wire or cable, with the Device 150 at the top of the pole.

The portable device 110 illustrated in FIG. 1 generally comprises a power source 117, an input/output/user interface element 115, a processor 112, memory 120, a display 118, a Global Positioning System (GPS) 119 or other component for determining location of the portable device 110, and a wireless system 116 all coupled together over a logical and physical interconnect or bus 114. The logical and physical bus 114 allows each of the connected elements to communicate directly or indirectly with each other. The power source 117 can be a direct current (DC) power source, such as a battery, an alternating current (AC) power source, such as an AC to DC adapter, or any other power source. The input/output/user interface element 115 can be one or more of a keypad, a microphone, a speaker, a touch pad, a pointing device, a trackball, a touchscreen, or any other way of entering commands on and/or communicating with a cellular phone, tablet computer, a laptop computer, a PDA, or the like.

The wireless system 116 is a communicating element that allows the portable device 110 to communicate wirelessly, over, for example, connection 130 shown in FIG. 1. The wireless system 116, may for example may comprise a radio/RF system including elements such as an antenna, a radio receiver, a radio transmitter (or a radio transceiver), controllers, logic, a dedicated processor, etc. to allow the portable device 110 to communicate using various wireless technologies or standards, such as Wireless Fidelity (Wi-Fi), near field communications (NFC), Bluetooth, etc.

The portable device 110 may be a dedicated device for use as part of the system 100, or may be a general purpose device, such as a laptop computer, cellular phone, tablet computer, etc. operating a program or application as discussed below. Accordingly, the processor 112 can be any general purpose or specific purpose digital or analog processor capable of executing instructions contained in the memory 120. The memory 120 can be a memory module, a memory system having a number of memory elements, a distributed memory system having multiple modules located at different locations, or any other type of memory suitable for storing software and firmware instructions. The memory 120 can be random access memory (RAM), read only memory (ROM), volatile memory, non-volatile memory, a removable memory element, such as a flash drive, or any other type of memory.

In the illustrated exemplary embodiment, the processor 112 can execute software stored in the memory 120 to control the operation of the portable device 110. As an example, the memory 120 may comprise an operating system 122, and access management software 124, which may include programs, code, instructions, algorithms, passwords, key codes, logic, etc. to allow the portable device 110 to communicate with the access module 140. The access management software 124 can be implemented in a number of ways, including, for example, as an executable application that is stored on and that runs on the portable device 110. The access management software 124 can be stored and transported on any computer-readable medium for use by or in connection with an instruction execution system that can fetch and execute instructions on or for the portable device 110. In the context of this document, a "computer-readable medium" can be any means that can contain or store a computer program for use by or in connection with an instruction execution system.

In an embodiment, the processor 112 executes the operating system 122 to control the normal operations of the portable device 110. The access management software 124, also executed by the processor 112, allows the portable device 110 to communicate with, request access to, receive data from, provide data to, and/or program/modify the access module 140 or the Device 150. In this manner, as more fully described below, the portable device 110 can directly manage, or can assist in the management of, the Device 150, such as out in the field where the Device 150 may be deployed in a telecommunications network.

The access module 140 illustrated in FIG. 1 generally comprises, a processor 141, memory 142, a wireless system 146, and a power source 148 all coupled together over a logical and physical interconnect or bus 144. The logical and physical bus 144 allows each of the connected elements to communicate directly or indirectly with each other. In embodiments, such as the one illustrated in FIG. 1, where the access module 140 is part of the Device 150, various components, such as the power source 148, processor 141, memory 142, and/or bus 144 may be part of the Device 150 that the access module 140 makes use of for performing the access management functions. In other embodiments, one or more of the components illustrated as part of the access module 140 in FIG. 1, may be dedicated components for the access module 140 (e.g., a separate, dedicated access module power source 148, bus 144, processor 141, and/or memory 142).

Figure 2:
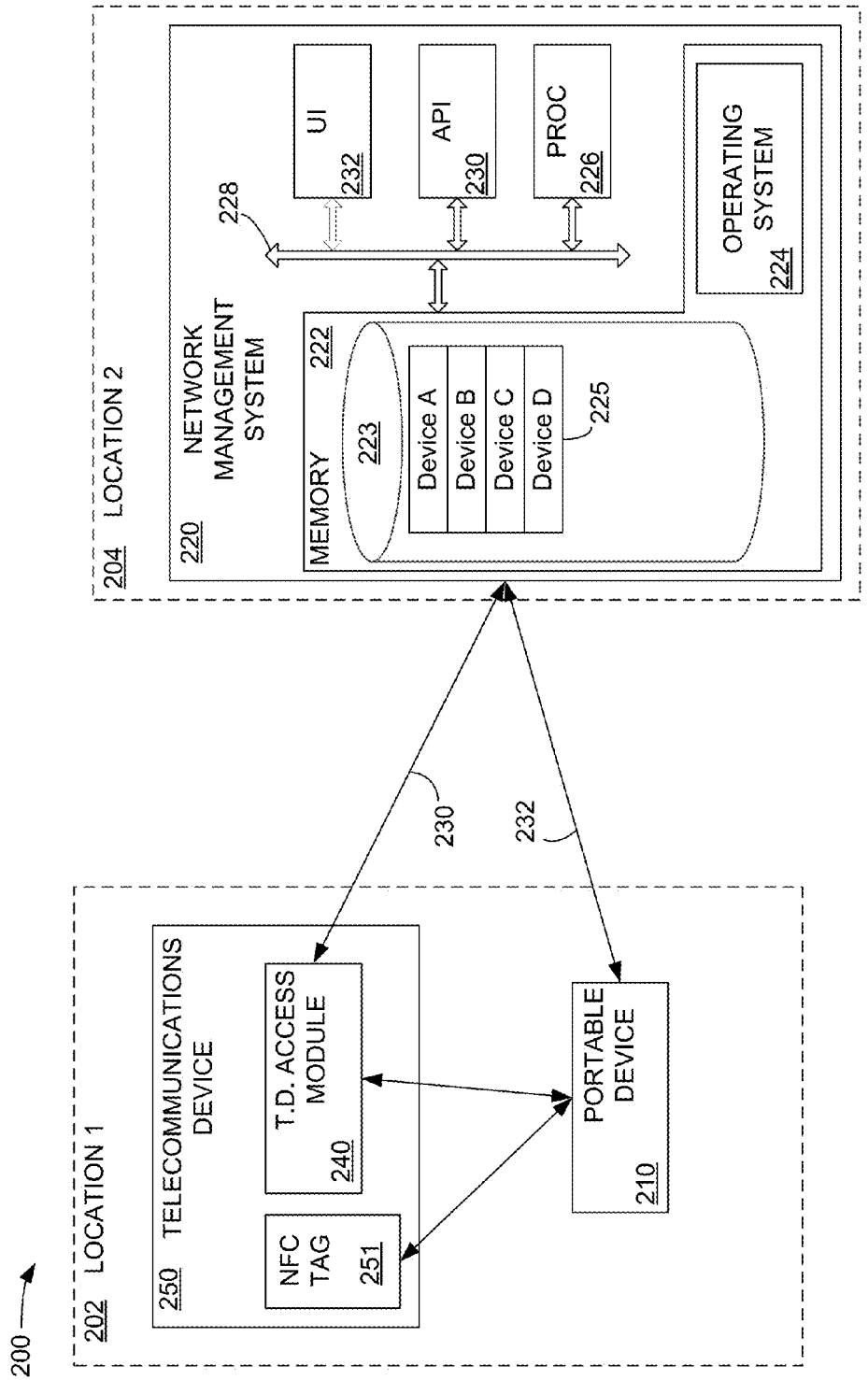
FIG. 2 is a block diagram illustrating an additional exemplary system for providing wireless management access to a telecommunication device, using the components illustrated in FIG. 1.

The power source 148 can be a direct current (DC) power source, such as a battery, an alternating current (AC) power source, such as an AC to DC adapter, or any other power source desired for a particular implementation. The wireless system 146 is a communicating element that allows the portable device access module 140 to communicate wirelessly, over, for example, connection 130 shown in FIG. 1 and/or to communicate with other portions of the network (FIG. 2). The wireless system 146, may for example comprise a radio/RF system including elements such as an antenna, a radio receiver, a radio transmitter (or a radio transceiver), controllers, logic, an addition dedicated processor, etc. to allow the portable device access module 140 to communicate using one or more wireless technologies or standards, such as Wireless Fidelity (Wi-Fi), near field communications (NFC), Bluetooth, etc. In some embodiments, the access module 140 may make use of a single wireless technology or standard, while in other embodiments, the access module 140 may make use of more than one wireless technology of standard.

The processor 141 can be any general purpose or specific purpose digital or analog processor capable of executing instructions contained in the memory 142. The memory 142 can be a memory module, a memory system having a number of memory elements, a distributed memory system having multiple modules located at different locations, or any other type of memory suitable for storing software and firmware instructions. The memory 142 can be random access memory (RAM), read only memory (ROM), volatile memory, non-volatile memory, a removable memory element, such as a flash drive, or any other type of memory. As an example, the memory 142 may comprise an operating system 145, and access management logic 143, which may include programs, code, instructions, algorithms, passwords, key codes, logic, etc. to allow the access module 140 to operate In the illustrated exemplary embodiment, the processor 141 of the access module 140 can execute the operating system 145 stored in the memory 142 to control its operation. As an example, the memory 140 may include logic for managing wireless access to the Device 150. The access management logic 143 may include code, instructions, algorithms, passwords, key codes, etc. that govern what devices may be allowed to communicate wirelessly with the Device 150, how and/or when such communications can take place, etc. The access management logic 143 of the access module 140 can be implemented in a number of ways, including, for example, as an executable application that is stored on a computer-readable medium and that runs on or is operated by the access module 140.

In an embodiment, the processor 141 executes the access management logic 143 to control access to the Device 150, such as by portable device 110. The processor 141 may execute the access management logic 143 to detect when wireless access to the Device 150 is attempted, such as by portable device 110. The processor 141 may alternatively or additionally operate the access management logic 143 to verify whether an attempted access by portable device 110 is permitted, such as by identification numbers, key codes, passwords, etc. If such access is permitted, the processor 141 may further operate to allow wireless or other communications with the Device 150, such as by portable device 110. Communications with the Device 150 may include the portable device 110 requesting access to, receiving data from, providing data to, and/or programming/modifying the access module 140 or the Device 150. Additionally, communications with the Device 150 may include the portable device 110 "bootstrapping" or otherwise initiating communications between the Device 150 and a different entity or computer, such as a Central Office (CO) for the network (See FIG. 2).

In various embodiments, the access module 140 may contain more or fewer components than illustrated in FIG. 1. Moreover, the access module 140 may be a separate component remotely located from, but in communication with, the Device 150. Access modules 140 that are separate and/or self-contained hardware device may be implemented for example as a retro-fit for existing Devices 150 in the field that do not have wireless communication capabilities.

Similarly, an access module 140 that is separate and/or remotely located may be implemented for a Device 150 located in a difficult to access location, such as on a pole, in a tower, or underground. For such a Device 150 located in a difficult to access location, the access module 140 may be coupled to the Device 150 such as with an Ethernet cable or RS-232 cable connected to an input port of the Device 150, or by other means. The access module 140 may then be installed at a location that is easy for the technician in the field to access and/or at a location that allows for NFC communications between the technician's portable device 110 and the access module 140.

Additionally, in some embodiments, the Device 150 may have more than one access module 140 (not shown). For example, if the Device 150 is a cabinet containing multiple different network elements or devices, the cabinet may contain separate access modules 140 for each network element. In such embodiments, it is not necessary for each access module 140 to be configured the same.

By way of another example using NFC technology, a Device 150 may comprise an NFC Tag 251 (See FIG. 2) configured to be "always on" seeking (or sending) signals in an NFC protocol to detect whether a wireless devices such as portable device 110 in its range. If a wireless device such as portable device 110 is found within range, the NFC Tag 251 may have sufficient memory and/or processing power to validate the portable device 110 for communications with the Device 150. Alternatively, the NFC Tag 251 may upon detecting the portable device 110, cause the access module 140 operating under the same, or different, wireless communication protocol or technology to activate and validate the portable device 110 as having access to the Device 150 and begin communications with the portable device 110. In some implementations, the NFC Tag 251 may be a separate component from the access module 140, while in other implementations the NFC Tag 251 may be a portion of the access module 140.

FIG. 2 is a block diagram illustrating an additional exemplary system for providing wireless management access to a telecommunication device. The system 200 comprises a first location 202 and a second location 204. The first location 202 is at a location of a telecommunication device, Device 250, such as for example when a technician with a portable device 210 is visiting the Device 250. The illustrated Device 250 includes, or is in communication with an access module 240 also at the first location 202. The access module 240 may be similar in structure and components to the access module 140 discussed above for FIG. 1, and the access module 240 may communicate with the portable device 210.

In the embodiment of FIG. 2, the Device 250, for example, also includes an NFC Tag 251. The NFC Tag 251 may separately communicate with the portable device 210 using near field communications when the portable device 210 is brought into range of the NFC Tag 251. In some embodiments, the NFC Tag 251 may be an "always on" tag, seeking and/or broadcasting signals to try and detect another NFC-capable device in range of the NFC Tag 251. In the illustrated embodiment, if the NFC Tag 251 detects an NFC-capable device such as portable device 210 in range, the NFC Tag 251 causes the access module 240 to begin communications with the portable device 210, either through the NFC communications protocol, or through some other wireless communications protocol or technology such as Wi-Fi or Bluetooth as may be desired.

The access module 240 may then verify, validate, or otherwise determine if the portable device 210 is a device permitted contact with the Device 250. This may be accomplished by any desired method, including through the use of pre-determined electronic keys located on the portable device 210, matching a username or other identification information about the portable device 210 or a user of the portable device 210, a user of the portable device 210 entering a password, determining whether the attempted access is during a time of day during which accesses to the Device 250 is authorized, determining whether the portable device 210 is a dedicated device authorized to access the Device 250, etc.

Additionally, as illustrated in FIG. 2 the first location 202 and second location 204 are in communication with each other, such as by exemplary connections 230 and 232. The connection 230 can be any wired, wireless, optical, or any other bi-directional high-speed, medium speed or low-speed communication links, as known in the art. Similarly, the connection 232 may be any desired communication link known in the art. As an example, the connection 232 can be implemented wirelessly to communicate using extensible markup language (XML) over a hypertext transfer protocol (HTTP) connection if desired. As another example, the connection 230 can be implemented using a wired connection (including over the fiber optic network such as GPON or point-to-point Ethernet) and implementing any standard communication protocol as known in the communication arts or a proprietary communication protocol.

The second location 204 can be a telecommunications company central office (CO), a switching station, a public or private network location, a network management center, or any other location that is typically located so as to communicate with the first location 202. As an example, the first location 202 can be a customer location having the Device 250 and the second location 204 can be a telecommunications company central office hosting an OLT that terminates the fiber optic network and a network management location having a network management system 220. The network management system 220 can be any network management system that is configured to manage, control, correspond with, and/or communicate with the communication device 250, including for the purposes of managing the operation of or initializing network service for the Device 250.

In an embodiment, the network management system 220 can be implemented as a computer device, such as a server computer, and includes a processor 226 connected to a memory 222 over a logical and physical bus 228. The logical and physical bus 228 allows each of the connected elements to communicate directly or indirectly with each other. The processor 226 can be any general purpose or specific purpose processor capable of executing instructions contained in the memory 222. The memory 222 can be a memory module, a memory system having a number of memory elements, a distributed memory system having multiple modules located at different locations, or any other type of memory suitable for storing software and firmware instructions. The memory 222 can be random access memory (RAM), read only memory (ROM), volatile memory, non-volatile memory, a removable memory element, such as a flash drive, or any other type of memory.

The logical and physical bus 228 allows each of the connected elements to communicate directly or indirectly with each other. The memory 222 includes a database 223 that can contain one or more elements of information pertaining to the communication device 250 and/or an operating system 224 that can be executed by the processor 226 to control and implement the operation of the network management system 220. In this example, the database 223 includes information 225 about a variety of communication devices, one of which can be the Device 250. The information 225 about the communication devices may include a listing of all devices maintained by the network management system 220, may be a list of devices located at the first location 202, may be a list of devices located at one or more locations, and may include various data about those communications devices that may be used to help manage the operation of the communication devices. The database 223 can be implemented in a number of ways known to those skilled in the art.

Further, the memory 222 can contain one or more elements of information pertaining to more than one communication device 250. In an embodiment, the database 250 can contain information needed to configure the Device 250 for initial service, information about the current configuration of the Device 250, and/or any other desired information about the Device 250. The network management system 220 also includes an application programming interface (API) 230 and/or a user interface (UI) 232 that allows personnel at the second location 204 to control various aspects of the operation of the network management system 220, and the interactions with the Device 250. Although shown as connected to the logical and physical bus 228, the application programming interface 230 and/or user interface 232 can be a separate element, or can be outside of the network management system 220.

In operation, once the portable device 210 has been verified and/or authorized by the access module 240, the portable device 210 may begin communications with the Device 250. Such communications may include the portable device 210 providing information to the Device 250 (including information needed to update or configure the Device 250). Additionally such communications may include the portable device 210 receiving information from the Device 250, such as identifier information about the Device 250 as well as statistical or other information about the operation of the Device 250 and/or the network traffic through the Device 250.

Note that in some embodiments, the initiation of the communication between the portable device 210 and the access module 240 (and the verification/authorization of the portable device 210) may be over a dedicated management channel that is a different from the channel used to communicate data between the Device 250 and portable device 210 after communications are established. In other embodiments, a single channel may be used for both establishing/verifying/authorizing the communications and any data transfer.

Further, communications between the portable device 210 and the Device 250 may trigger the portable device to establish a simultaneous communication with the network management system 220. The portable device 210 will use the information it received from the Device 250 to retrieve a logical identification (also called a Registration ID in some embodiments) for the Device 250 from the network management system 220. The portable device 210 will provide this logical identification to the Device 250. The Device 250 identifies itself to the OLT on the carrier's network using the logical identifier to set up a communication path between the Device 250 and the network management system 220. This process triggers setting up services on the Device 250. Communications link 230 may be the telecommunications network (including a fiber optic network) of which the Device 250 is a part. One example of this may occur when the Device 250 is an Optical Network Terminal (ONT) for terminating the optical fiber at a residential or business customer. Such ONT's are typically attached to the residential or business customer building.

One example of an above operation may be adding an ONT to the network for a new customer. Adding an ONT to the network typically requires communications with the network management system 220 to initialize the network service for the ONT/Device 250. Using the system 200 of FIG. 2, a technician operating a portable device 210 may approach the ONT/Device 250. When NFC is used as the wireless technology of choice, the NFC tag 251 and/or access module 240 of the ONT/Device 250 may initiate wireless communications with the portable device 210. Once the portable device 210 has been verified and/or authorized by the NFC tag 251 and access module 240, the portable device 210 may begin communications with the Device 250. The portable device 210 may gather information about the model, serial number, etc. of the ONT/Device 250 needed to add the ONT to the network by initiating communications with the network management system 220, in this case a central office (CO) for a telecommunications network, in the manner described above.

The above is one example of the operation of the system 200 illustrated in FIG. 2. One skilled in the art would understand that other examples of using the portable device 210 to establish communications with one or more Devices 250 in operation in the field at a first location 204 are possible. One skilled in the art would also understand that the portable device 210 once in communication could be used either alone or in combination with the network management system 220 to perform other operations with or on one more Devices 250 in the field, such as troubleshoot, repair, update, upgrade, re-configure, and/or gather information from or about the operation of the Device(s) 250. All such other examples are intended to be included within the scope of this disclosure.

Figure 3:
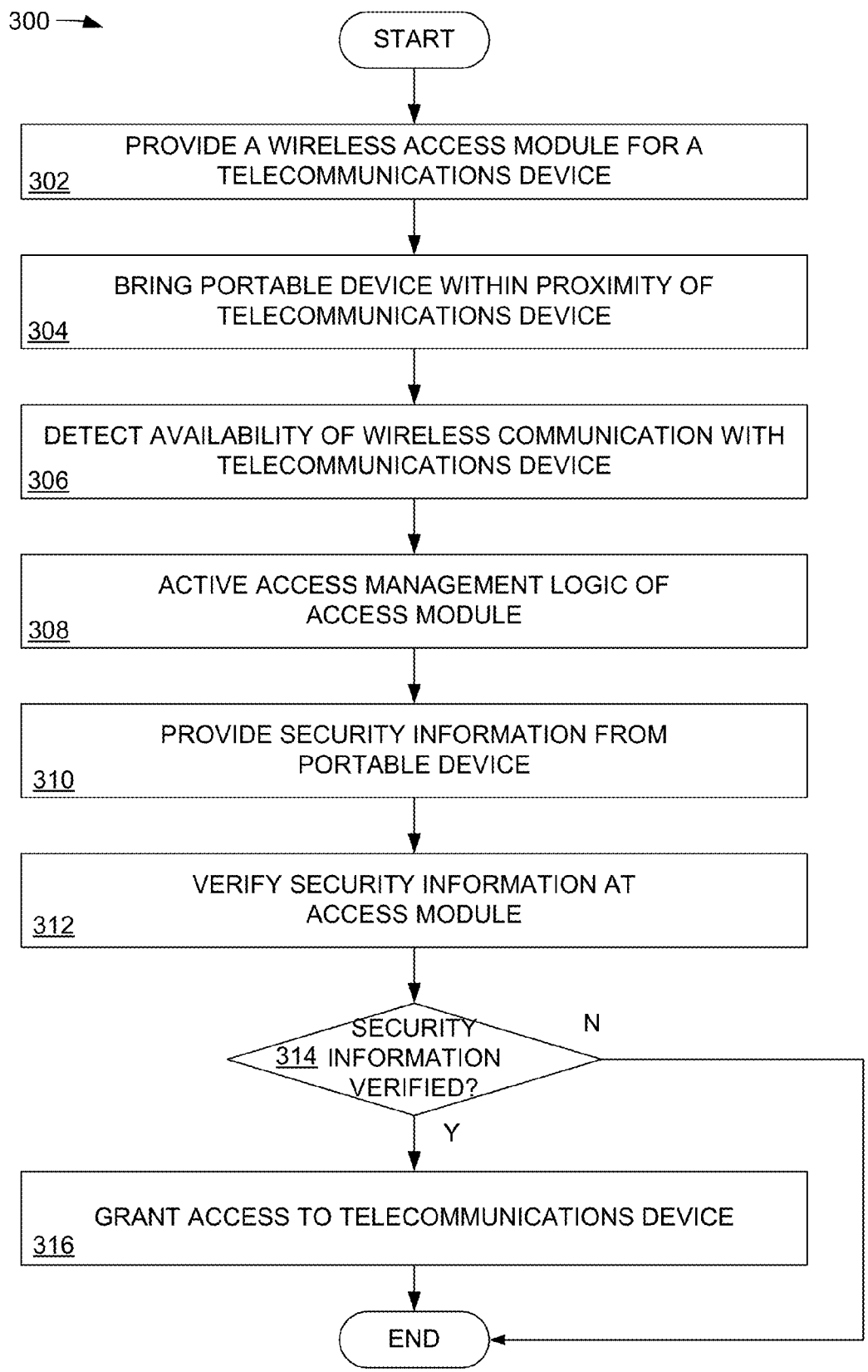
FIG. 3 is a flowchart describing the operation of an embodiment of the system and method for providing wireless access management to a telecommunication device.

FIG. 3 is a flowchart 300 describing the operation of an embodiment of the method for providing wireless management access to a telecommunication device. FIG. 3 illustrates an exemplary operation of a portable device 110/210 and the telecommunication device, Device 150/250 in establishing communication. In block 302, a wireless access module 140/240 is provided for a Device 150/250. The wireless access module 140/240 may be provided at the time the Device 150/250 is initially installed. Alternatively, the wireless access module 140/240 may be retro-fit to an existing Device 150/250 already implemented in a telecommunications or other network.

In block 304, a portable device 110/210 is brought into proximity of the wireless access module 140/240. The proximity for a wireless access module 140/240 may depend on the wireless technology being implemented by the particular wireless access module 140/240 and/or Device 250. For instance, in some embodiments, use of NFC protocols to establishing/authorizing communications between the portable device 110/210 and the wireless access module 140/240 may be desired for added security. In such embodiments, the portable device 110/210 is brought into a close physical proximity to the wireless access module 140/240 (or the NFC portion of the wireless access module 140/240 such as NFC Tag 251 of FIG. 2) in order to enable such NFC communication. In other embodiments where the wireless access module 140/240 uses other wireless protocols or technologies to establish/authorize communications, the proximity for the portable device 110/210 may not use close physical proximity, but only enough proximity to enable the required wireless protocol or technology.

In block 306, the availability of wireless communication with the Device 150/250 is detected. In some embodiments, block 306 may comprise the portable device 110/210 detecting a signal from the Device 150/250 and/or wireless access module 140/240. For example, as illustrated in FIG. 2, the Device 250 may include an NFC Tag 251, either separate from, or as part of the wireless access module 240. In such embodiments, a portable device 210 placed within range of the NFC Tag 251 may detect a signal from the NFC Tag 251 and attempt to access the Device 250 wirelessly. Alternatively, in some implementations, the NFC Tag 251 may detect that an NFC-capable portable device 210 is within range, and the NFC Tag 251 may attempt to begin wireless communications with the portable device 210. In other embodiments, an NFC Tag 251 may not be used at all, and the detecting of block 306 may be performed by the wireless access module 140/240 itself detecting the presence of the portable device 110/210, or the portable device 110/210 detecting the presence of the access module 140/240, using NFC or any other desired wireless protocol or technology.

Once the availability of wireless communication has been detected in block 306, the access management logic of the access module 140 is activated in block 308. In some embodiments, this logic may be access management logic 143 reside within a dedicated memory 142 of access module 140 as illustrated in FIG. 1. In other embodiments, this logic may reside within the NFC Tag 251, or may reside elsewhere such as in a general memory of the Device 150 that is shared with the access module 140.

In an embodiment, as discussed above, the purpose of this logic is to provide verification of and/or authorization for the portable device 110/210 attempting to wirelessly communicate with the Device 150/250. Such verification and/or authorization may be provided in a variety of ways and the remaining blocks of the exemplary embodiment of FIG. 3 illustrate one such method. In block 310, security information is provided from the portable device 110/210. Providing such information from the portable device 110/210 may comprise: automatically pushing security information residing in the portable device 110/210 to the access management logic; automatically pulling security information residing in the portable device 110/210, such as by the access module 140/240; requiring a user of the portable device 110/210 to enter security information into the portable device 110/210, such as through user interface 115 illustrated in FIG. 1; or a combination of these.

Additionally, the security information provided in block 310 may comprise any desired information that would allow the access management logic to determine whether to allow the portable device 110/210 to communicate with the Device 150/250. Exemplary security information could include: one or more electronic keys located on the portable device 110/210; a username, serial number, other identification information about the portable device 110/210 and/or a user of the portable device 110/210; a password or other code residing on or entered by a user of the portable device 110/210; a time of day during which the wireless access is attempted; location information about the portable device 110/210 such as location information from the GPS 119 (See FIG. 1) of the portable device 110/210; etc.; and/or a combination of one or more of these.

In block 312 the provided security information is verified. In some embodiments, verifying the provided security information may comprise comparing the provided security information with information residing in the access management logic. In various embodiments, the verifying of block 312 may be performed by the NFC Tag 251 (FIG. 2), by the access module 140/240, or by a combination of these. For example, in one embodiment, block 312 may comprise the access management logic 143 of the access module 140 comparing the provided security information of block 310 with information stored in memory 142 of the access module 140.

Note that in some embodiments, the providing security information of block 310 and verifying the security information 312 may comprise multiple iterations of these blocks. Further, the various iterations of these blocks may be performed by different components. For example, in one embodiment, the NFC Tag 251 may automatically receive device identifier information from the portable device 210, and the NFC Tag 251 may verify the device identifier with information stored in or accessible to the NFC Tag 251. Continuing this example, in a second iteration of blocks 310 and 312, the portable device 210 may provide additional security information such as a username for a user of the device to the access module 240 and the access module 240 may verify the username. In various embodiments, blocks 310 and 312 may iterate additional times, such as by the portable device 210 providing a password to the access module 240 which is then verified by the access module 240, etc.

Once the various iterations of block 310 have been completed, the access module 140/240 will make a determination whether the portable device 110/210 is authorized in block 312. The determination may be made using any desired algorithm, logic, or instructions, which may be part of the access management logic 143 or otherwise stored in the memory 142 of the access module 140 (or stored in a memory elsewhere on the Device 150). If the portable device is not authorized in block 314, wireless access to the Device 150/250 is denied and the exemplary method 300 ends.

If the portable device is authorized in block 314, access to the Device 150/250 is granted in block 316. Such grant of access may include allowing the portable device 110/210 to communicate wirelessly with the Device 150/250 in order to obtain information from, provide information to, and/or manage the Device 150/250. Such grant of access may also include the portable device 110/210 "bootstrapping" or otherwise causing a second computer device, such as network management system 220 (FIG. 2) to provide a logical identifier (such as a Registration ID) for the Device 150/250.

For example, grant of access to the telecommunications device 150/250 in block 316 may trigger the portable device 110/210 to establish a simultaneous communication with the network management system 220. The portable device 110/210 may use the information it received from the Device 150/250 to retrieve a logical identification for the device from the network management system 220. The portable device 110/210 may provide this logical identification to the Device 150/250. The Device 150/250 may identify itself to the network management system 220 using the logical identifier to set up a communication path between the Device 150/250 and the network management system 220. This process may trigger setting up services on the Device 150/250.

Figure 4:
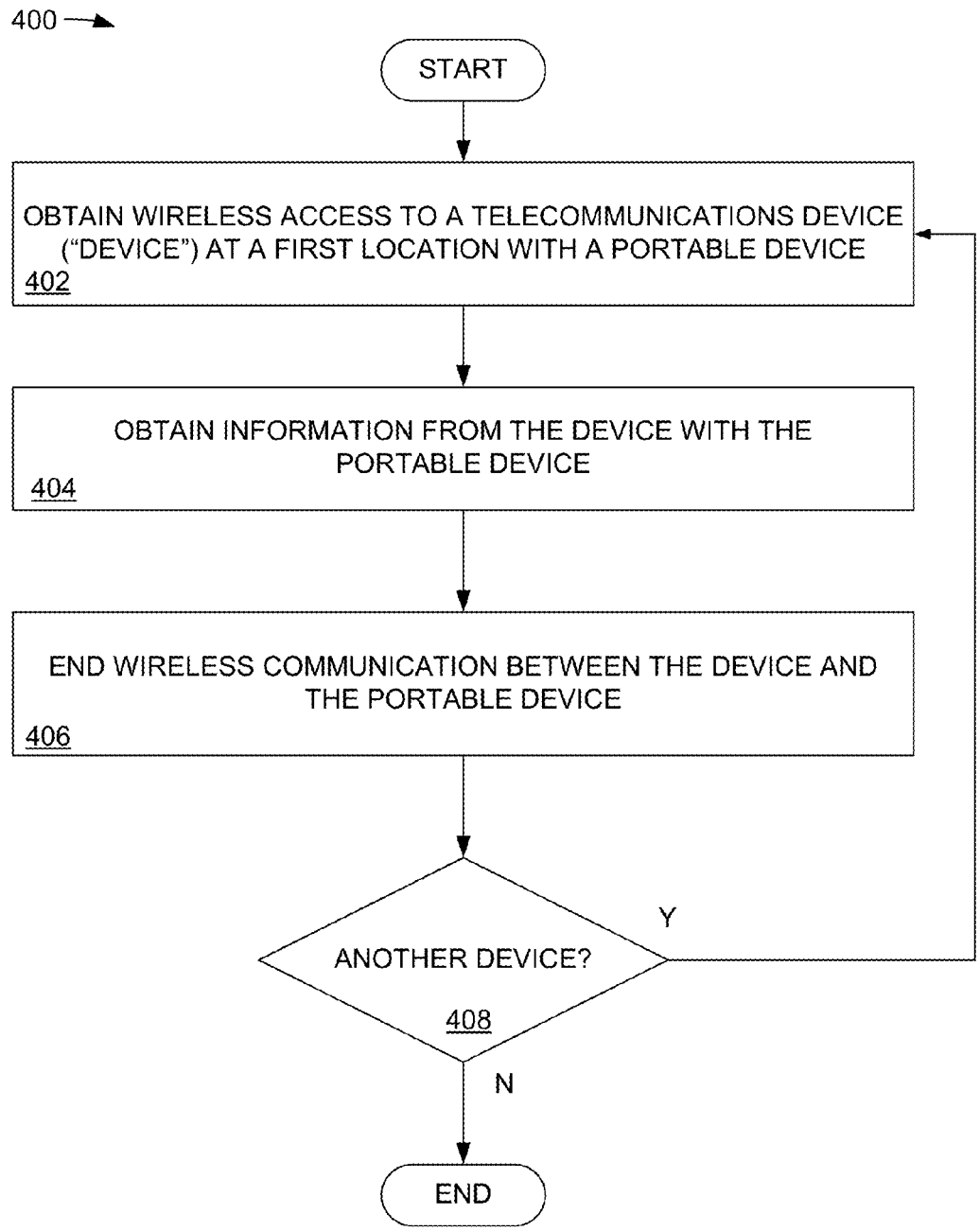
FIG. 4 is a flowchart describing the operation of an embodiment of the system and method for providing wireless management of a telecommunication device once access has been granted, such as by the method of FIG. 3.

FIG. 4 is a flowchart describing an exemplary method 400 of operation of an embodiment of the system for providing wireless management of a telecommunication device once wireless access has been granted, such as by the method 300 of FIG. 3. In block 402, wireless access to a telecommunication device, Device 250 for example, at the first location 202 is obtained by a portable device 210. Such access may be obtained for example using the exemplary method 300 of FIG. 3. The portable device 210 may also be located at the first location 202 in some embodiments.

In block 404, the portable device 210 obtains information about the Device 250. Such information may include identification information for the Device 250, such as a model number, serial number, etc. Such information obtained in block 404 may also include information about the operation of the Device 250 such as configuration information, information about the operation of the Device 250 (such as amount of traffic, error conditions, dropped traffic, etc.), as well as information about the network traffic being handled by the Device 250.

In block 406, the portable device ends the wireless communication with the Device 250. In block 408, the user checks if there are more such Devices 250 in the vicinity and if so, proceeds to connect to the next such device. For example, a determination may be made in block 408 whether an additional Device 250 is located at the first location 202. In some embodiments, the first location 202 may be a tower, pole, or cabinet containing multiple Devices 250. In such embodiments, the portable device 210 or the network management system 220 may determine whether or not there are additional Devices 250 at the first location 202. The portable device 210 may make such determination by recognizing or detecting additional NFC Tags 251, or other wireless communications from such additional Devices 250. In such embodiments, if the portable device determines that there are additional Devices 250 in block 408, the method 400 returns to block 402 and wireless access to the additional Device 250 is obtained, such as by the exemplary method illustrated in FIG. 3. If no additional Device 250 is detected in block 408 (regardless of how detected), method 400 ends.

Figure 5:
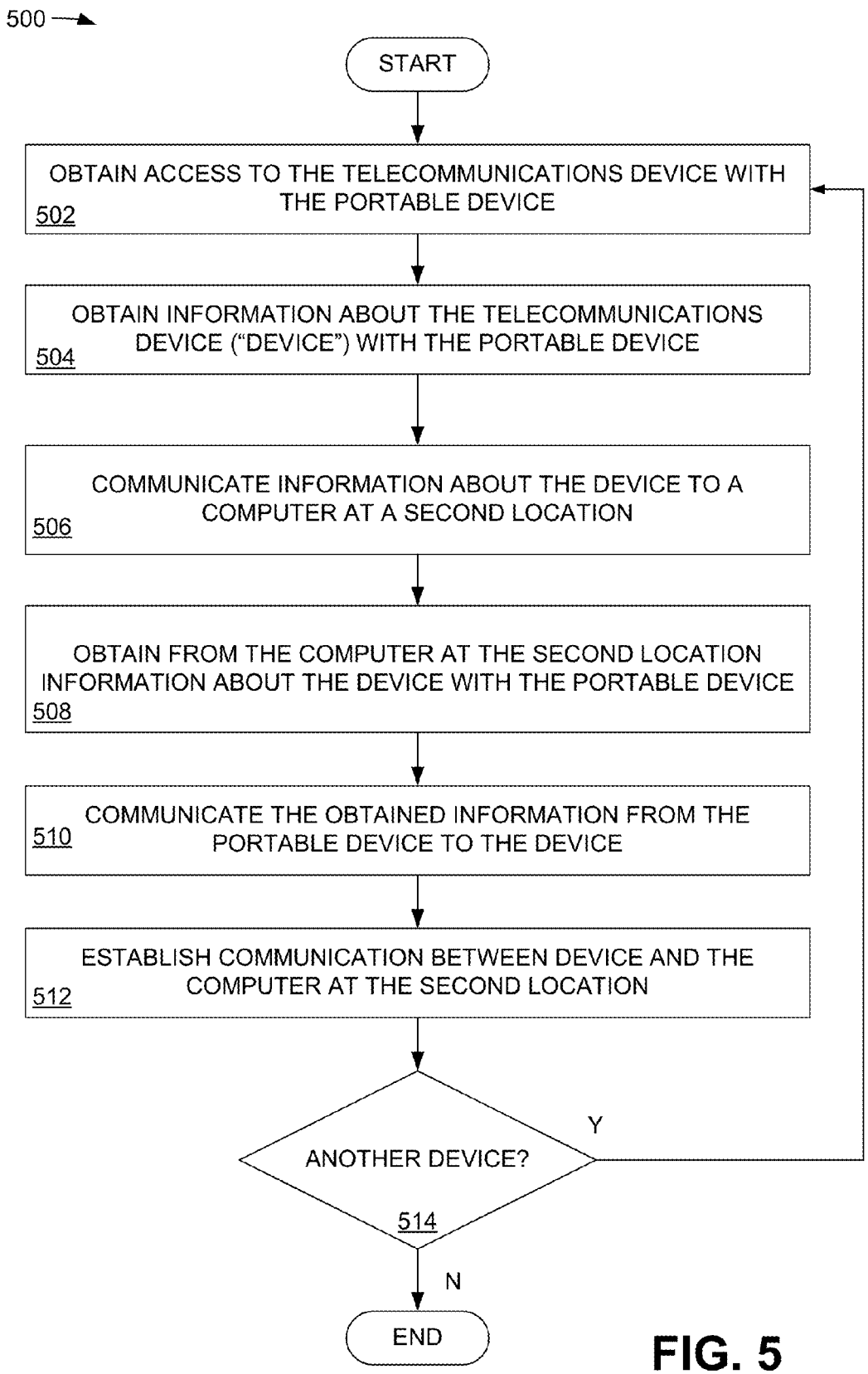
FIG. 5 is a flowchart describing the operation of an alternative embodiment of the system and method for providing wireless management of a telecommunication device once access has been granted, such as by the method of FIG. 3.

FIG. 5 is a flowchart describing an alternative exemplary method 500 of operation of an embodiment of the system for providing wireless management of a telecommunication device once wireless access has been granted, such as by the method 300 of FIG. 3. In block 502, wireless access to a telecommunications device, such as Device 250 at the first location 202 for example, is obtained by the portable device 210. Such access may be obtained for example using the exemplary method 300 of FIG. 3. The portable device 210 may also be located at or near the first location 202 in some embodiments.

In block 504, the portable device 210 obtains information about the Device 250. Such information may include identification information for the Device 250, such as a model number, serial number, etc., and may in some embodiments include information similar to that discussed above with respect to block 404 of FIG. 4.

In block 506, the portable device 210 establishes communication with the computer at a second location 204 and provides the information obtained from the Device 250. The computer at the second location 204 may be the carrier's network management system 220 at the central office or elsewhere inside the carrier's telecommunication network. The exact nature of the request made by the portable device 210 (and the response required from the carrier's telecommunication network, if any) will be dependent on the context. In the following blocks, an example is given of a logical identifier for the Device 250 that is critical in a GPON fiber optic network. However, other examples of requests made by the portable device 210, and response(s) to the portable device 210, are possible as would be understood by one of ordinary skill in the art.

In block 508, the network management system 220 looks up a logical identifier for the Device 250 based on the information supplied by the portable device 210. The network management system 220 keeps a database 240 of the Devices 250 in the carrier's network within its scope of control. Once the logical identifier is located, it is provided back to the portable device 210. In this example, the logical identifier may be a Registration ID used to identify an ONT (Optical Network Terminal), an example of a Device 250 with an OLT (Optical Line Terminal).

In block 510, the portable device 210 communicates the logical identifier (Registration ID) and any other information provided by the network management system 220 back to the Device 250.

In block 512, the Device 250 establishes communications directly with the carrier network, such as with a computer at the second location 204. In an embodiment, such communication in block 512 may comprise the Device 250 registering with the carrier's network using the information provided by the network management system 220. For example, in such embodiments this information provided by the network management system 220 may contain the logical identifier (Registration ID) in a GPON fiber optic network. This identifier is received by the OLT (Optical Line Terminal) that is located at the central office in the carrier network that may or may not be co-located with the network management system 220 as desired. The OLT uses the identifier to match against its own local provisioning to allow a valid and carrier-certified Device 250 into the network. A successful registration of the Device 250 triggers the required service provisioning on the Device 250 by the OLT in order to provide end-customer services such as data, video and voice. In other embodiments, establishing communication between the Device 250 and the computer at the second location in block 512 may comprise the exchange of other information between the Device 250 and the computer at the second location, including information similar to that discussed above with respect to block 504 and/or block 404 of FIG. 4.

In block 514, a determination is made whether an additional Device 250 (not shown) is located at the first location 202. For example, in some embodiments, the first location 202 may be a tower, pole, or cabinet containing multiple Devices 250. In such embodiments, the portable device 210 may determine whether or not there are additional Devices 250 at the first location 202. The portable device 210 may make such determination by recognizing or detecting additional NFC Tags 251, or other wireless communications from such additional Devices 250. In such embodiments, if the portable device determines that there are additional Devices 250 in block 514, the method 500 returns to block 502 and the location of the portable device 210 is initialized. If the determination in block 514 is that there are no additional Devices 250 at the first location 202, the method 500 ends.

FIGS. 6A through 6D are a series of diagrams showing an example of the operation of components of an embodiment of the system and method for providing wireless management access to a Device 150/250. In the example shown in FIG. 6A, the portable device 110/210 (labeled in FIGS. 6A-6D as 110 for clarity) is shown as a smart phone with a display 118 (See FIG. 1). In an embodiment, the display 118 comprises a touch screen display that can be used as an information display (118, FIG. 1) and as a user input device (115, FIG. 1). However, such a display 118 is shown for illustration purposes only. Other types of portable devices 110 having other types of input and display features and elements can be implemented. The display 118 can be used to display various user interface features and elements. For example, the portable device 110 comprises an icon 602 that refers to the network management system 220. The initials "MSP" (Managed Server Platform) are exemplary and refer to an example of a network management system 220. A "find device" menu choice 604 refers to the ability of the portable device 110 to locate a communication device, such as the Device 150/250, located at a location. In this example, the portable device 110 is located at the first location 202 (See FIG. 2). A "Search" button 606 can be activated to search the current location, i.e., in this example, the first location 202 at which the portable device 110 is located. The term "current location" refers to the instant location of the portable device 110.

Figure 6B:
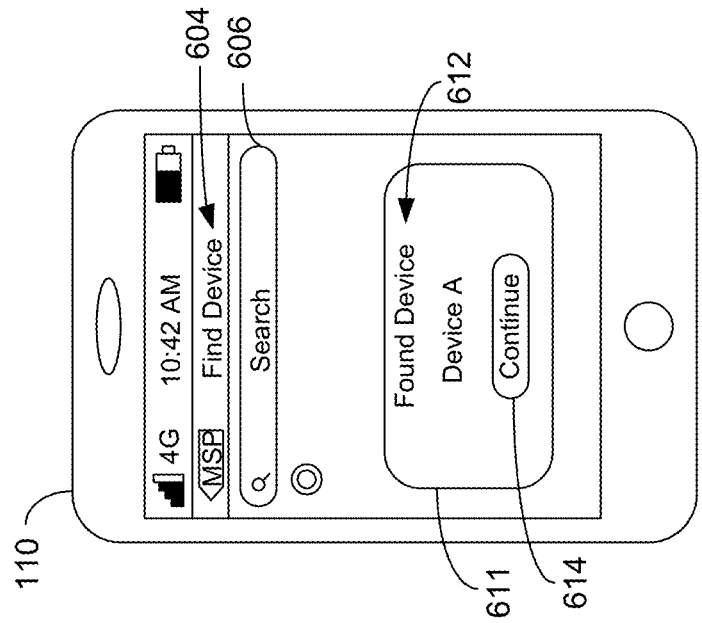
Figure 6A:
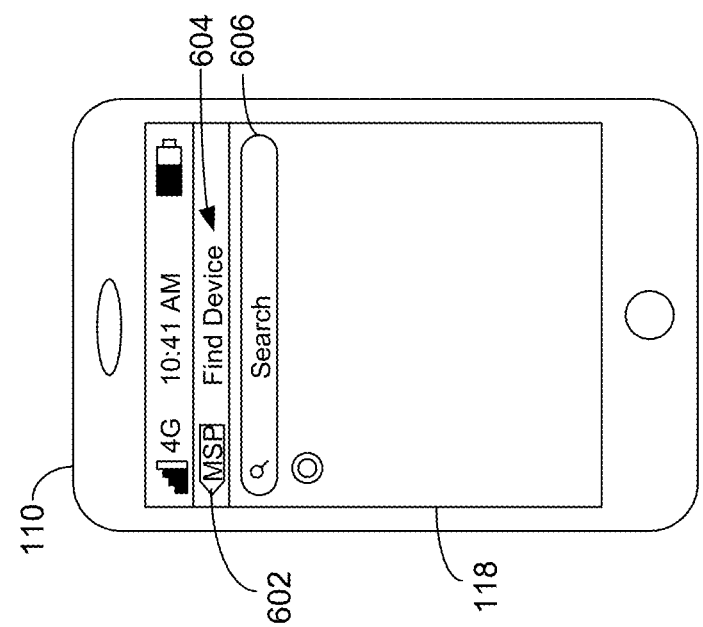

In FIG. 6B, the portable device 110 illustrates that it has found or detected a Device 150/250, at or near the location at which the portable device 110 is located. Detection of the Device 150/250 may be made as discussed above by any desired means, such as by receiving a signal from an NFC Tag 251 or from an access module 140/240 of the Device 150/250. Detecting the Device 150/250 may also include receiving information identifying the Device 150/250, especially when more than one device may be present at the first location 202.

A window 611 may be displayed to the user of the portable device 110 providing a "Found Device" notification 612. Additionally, information may also be displayed to the user of the portable device 110 that identifies or describes the Device 150/250 detected. In this example, the "Found Device" is a Device 150/250 called "Device A." The nomenclature "Device A" refers to a model or type of communication device and is shown for example only. Each Device 250 may be assigned a plain English designator to facilitate communication between users. The user may be able to access further information about the particular Device 150/250 (e.g., Device A) and/or may cause the portable device 110 to attempt to wirelessly access the Device 150/250 by actuating the "continue" button 614. In other embodiments, such wireless access may be automatically attempted by the portable device 110 without need for input from the user.

In FIG. 6C, the portable device 110 illustrates an alternative embodiment where the portable device has found or detected a number of Devices 150/250 located within proximity of the portable device 110 at the first location 202. A window 615 may indicate or provide a list of Devices 150/250 detected. In such embodiments, to proceed with attempting to wireless access one of the devices in the window 615, a user may actuate one of the buttons 616 associated with the selected Device 150/250.

In FIG. 6D the portable device 110 illustrates that the user has actuated the button 616 in FIG. 6C. The icon 617 refers to the Device 150/250 (e.g., Device A), that the user has selected for attempted wireless access by the portable device 110. The display 118 may also, and optionally, show a series of menu items 618 under the icon 617. In this example, the menu items 618 include "Jobs," "Users," "Phones," "Wireless," "Status," "Call Data," and "Network." Such menu items 618 may include information about the selected Device 150/250 provided by the device itself once wireless communications with the Device 150/250 has been established (such as by the exemplary method 300 of FIG. 3).

Additionally, the menu items 618 may also include further menus or items that may be selected or actuated by the user in order to cause the portable device 110 directly manage (or assist the network management system 220 to manage) the Device 150/250. The menu items 618 listed in FIG. 6D are exemplary and the particular menu items 618 displayed by vary depending on the Device 150250 selected by the user and/or the status of the Device 250 (e.g. whether the device is already part of the network or needs to be added to the network).

While various embodiments of the invention have been described, it will be apparent to those of ordinary skill in the art that many more embodiments and implementations are possible that are within the scope of this invention.

What is claimed is:

1. A system for managing a network device forming a node of a telecommunications network, the system comprising:
   a wireless access module electrically coupled with the network device, both the wireless access module and the network device installed at a first location, wherein the wireless access module is configured to detect that a portable device is at the first location in proximity to the network device, the wireless access module comprising:
      a wireless communication element for receiving a security information from the portable device, and
      an access management logic for authorizing the portable device to communicate wirelessly with the network device through the wireless communication element in response to the received security information,
      wherein a wireless communication from the network device to the portable device through the wireless communication element comprises an identifier of the network device.

2. The system of claim 1, wherein the wireless access module is physically separate from the network device.

3. The system of claim 2, wherein the network device is buried underground.

4. The system of claim 1, wherein the wireless access module is further configured to detect that the portable device is in proximity to the network device by near field communications (NFC).

5. The system of claim 4, wherein the wireless access module further comprises an NFC tag configured to detect that the portable device is in proximity to the network device.

6. The system of claim 5, wherein the NFC tag is located apart from the wireless access module.

7. The system of claim 4, wherein the wireless communications with the network device through the wireless communication element comprises a wireless fidelity (Wi-Fi) communication.

8. The system of claim 1, wireless access module is further configured to communicate with a second computer system after authorizing the portable device to communicate wirelessly with the network device.

9. The system of claim 8, wherein the second computer system is located at a second location remote from the network device, and wherein the network device is configured to join the telecommunications network in response to an instruction received at the network device from the second computer system to add the network device to the telecommunications network.

10. A method for managing a network device forming a node of a telecommunications network, the method comprising:
    providing the network device at a first location;
    detecting a portable device at the first location in proximity to the network device;
    receiving with a wireless access module of the network device a wireless communication from the portable device, the wireless communication including a security information;
    verifying with the wireless access module the security information received from the portable device;
    authorizing with the wireless access module communications between the network device and the portable device; and
    sending with the wireless access module an identifier for the network device to the portable device.

11. The method of claim 10, wherein the wireless access module comprises a separate component at the first location, located remotely from the network device and in electrical communication with the network device.

12. The method of claim 10, wherein detecting a portable device at a first location in proximity to the network device further comprises detecting the portable device with near field communications (NFC).

13. The method of claim 12, wherein detecting the portable device with near field communications (NFC) further comprises detecting the portable device with an NFC tag.

14. The method of claim 13, wherein the NFC tag is located apart from the wireless access module.

15. The method of claim 12, wherein the wireless communication received from the portable device by the wireless access module comprises wireless fidelity (Wi-Fi) communication.

16. The method of claim 10, further comprising receiving a communication at the network device from a second computer system located at a second location remote from the network device, the communication from the second computer system including an instruction for managing an operation of the network device.

17. The method of claim 16, wherein the instruction for managing the operation of the network device comprises an instruction to add the network device to a telecommunications network.

18. A method for managing a telecommunication device forming a node in a telecommunications network, comprising:
    providing the telecommunication device at a first location;
    detecting a portable device at the first location in proximity to the telecommunication device;

receiving with a wireless access module of the telecommunication device a wireless communication from the portable device, the wireless communication including a security information;

verifying with the wireless access module the security information received from the portable device;

authorizing with the wireless access module communications between the telecommunication device and the portable device;

sending with the wireless access module an identifier for the telecommunication device to the portable device;

communicating the identifier for the telecommunication device from the portable device to a second computer system located at a second location remote from the telecommunication device;

receiving at the portable device a logical identification for the telecommunication device sent from the second computer system at the second location;

sending the received logical identification from the portable device to the telecommunication device to establish a communication channel between the telecommunication device and the second computer system at the second location; and receiving at the telecommunication device a communication from the second computer system, the communication from the second computer system including an instruction to manage the operation of the telecommunication device.

19. The method of claim 18, wherein the wireless access module comprises a separate component, located remotely from the telecommunication device and in communication with the telecommunication device.

20. The method of claim 19, wherein the detecting a portable device at a first location in proximity to the telecommunication device is performed by a near fields communications (NFC) communication between the portable device and the wireless access module.

* * * * *